United States Patent [19]
Brandjord

[11] 3,806,185
[45] Apr. 23, 1974

[54] RETRACTABLE LOAD BOX COVER

[76] Inventor: Glenn O. Brandjord, Rt. 1, Souris, N. Dak. 58783

[22] Filed: July 24, 1972

[21] Appl. No.: 274,404

[52] U.S. Cl. .............................................. 296/98
[51] Int. Cl. .............................................. B60j 11/00
[58] Field of Search ............................ 296/100, 98

[56] References Cited
UNITED STATES PATENTS

| | | | |
|---|---|---|---|
| 2,757,042 | 7/1956 | Schultz | 296/100 |
| 2,807,499 | 9/1957 | Duddleston | 296/100 |
| 1,031,206 | 7/1912 | Sowers | 296/100 |
| 3,041,104 | 6/1962 | Richard | 296/100 |
| 3,205,002 | 9/1965 | Seng | 296/100 |

*Primary Examiner*—Robert R. Song
*Attorney, Agent, or Firm*—Clarence A. O'Brien; Harvey B. Jacobson

[57] ABSTRACT

A cover assembly for an upwardly opening receptacle including opposite ends and longitudinally extending opposite side walls. The cover assembly includes an elongated flexible cover panel having one end portion anchored to one end of the receptacle and a pair of pulleys are journalled from the opposite end portions of the upper marginal edge portion of each side wall and have an endless flexible member trained thereabout. The other end portion of the flexible cover includes structure for attaching the opposite side marginal edge portions of the cover to the upper reaches of the corresponding endless tension members. Orbital movement of the endless flexible tension members about the pulleys causes longitudinal shifting of the upper reaches of the tension members and in this manner the free end portion of the flexible cover panel may be moved toward and away from the far end of the load receptacle.

6 Claims, 5 Drawing Figures

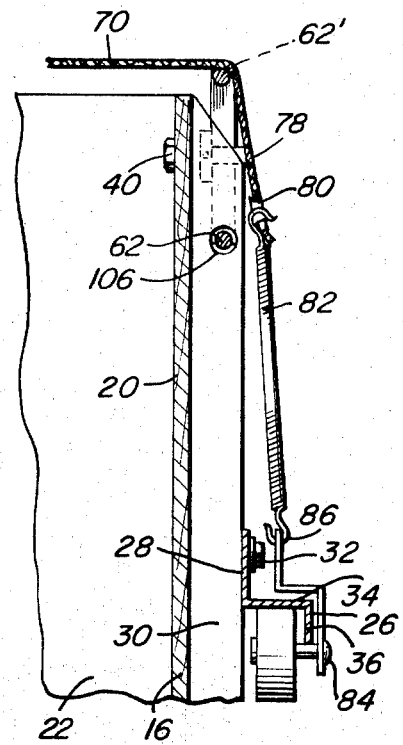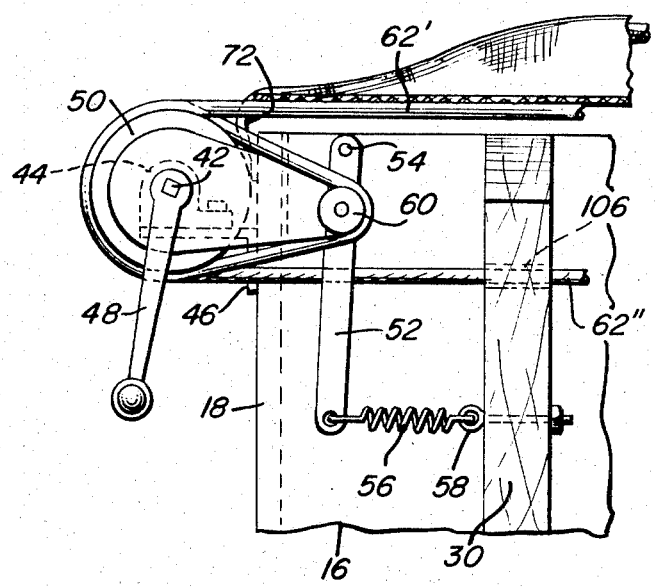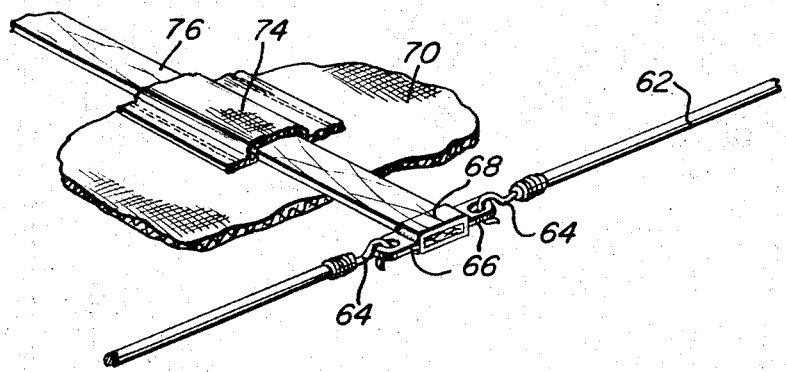

RETRACTABLE LOAD BOX COVER

The retractable load box cover of the instant invention includes simplified structure by which a flexible cover panel may be extended and retracted over the upper portion of a load box. The cover assembly is entirely supported from the load box and may therefore be utilized in conjunction with substantially all types of load boxes, whether they be mounted on mobile chassis or stationarily supported.

The retractable load box cover is constructed in a manner whereby abrasive wear on the flexible cover panel thereof will be maintained at a minimum and the cover panel may be readily extended and retracted by a single person.

The main object of this invention is to provide an improved flexible retractable cover panel for an upwardly opening load receptacle.

Another object of this invention is to provide a retractable load box cover utilizing a flexible cover panel and means for extending and retracting the cover panel in a manner so as to reduce abrasive wear thereon.

Yet another object of this invention is to provide a retractable load box cover constructed in a manner whereby the free extendible end thereof may be utilized as a boot for storing the cover in a retracted position protected against the elements.

Another important object of this invention is to provide a retractable load box cover whose structural features and components are commercially available and readily mountable on conventional forms of load receptacles.

A still further object of this invention is to provide a load box cover of the retractable type which, when in use, is primarily supported from the side walls of the associated load box but which may be supported, when in the retracted position, solely from one end wall of the load box thereby enabling the other end wall and both side walls of the load box to be removed.

A final object of this invention to be specifically enumerated herein is to provide a retractable load box cover in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is an enlarged fragmentary transverse vertical sectional view taken substantially upon the plane indicated by the section line 3—3 of FIG. 1;

Figure 1:
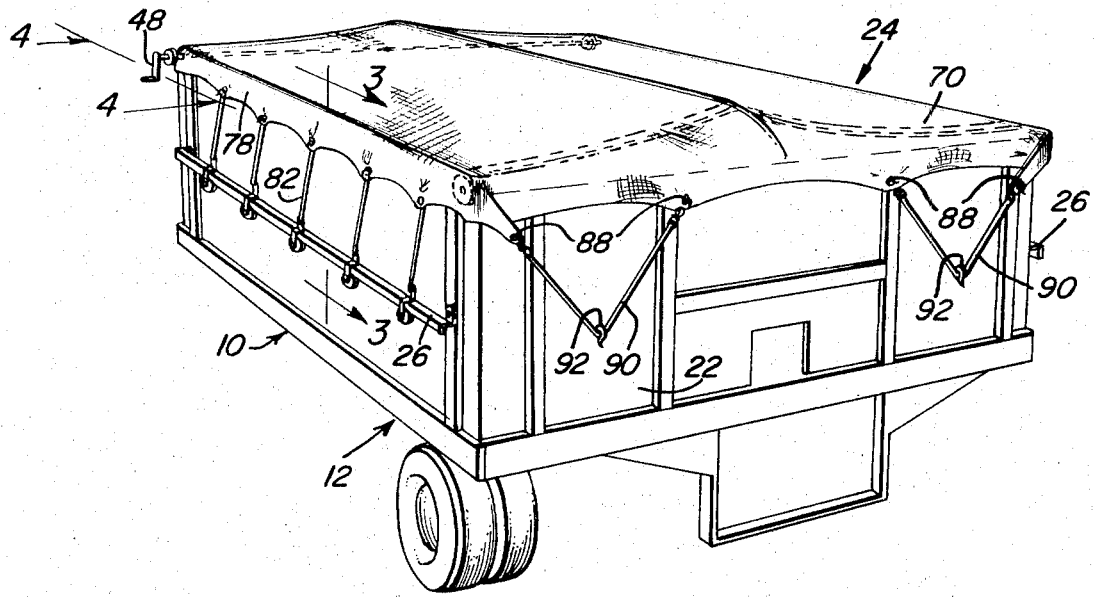
FIG. 1 is a perspective view of a conventional form of mobile load box with the cover assembly of the instant invention operatively associated therewith and in the extended position.

FIG. 4 is a fragmentary longitudinal vertical sectional view taken substantially upon the plane indicated by the section line 4—4 of FIG. 1; and FIG. 5 is a fragmentary perspective view of one side portion of the free end portion of the flexible cover panel of the cover assembly illustrating the manner in which each side portion of the free end of the cover panel is connected to the associated endless tension member for extending and retracting the cover panel.

Referring now more specifically to the drawings, the numeral 10 generally designates a conventional form of truck including an upwardly opening load box referred to in general by the reference numeral 12. The load box 12 includes a flooring assembly or bed 16, a stationary front wall 18, removable opposite side walls 20 and a removable end wall or gate 22. Any suitable means (not shown) may be utilized to removably secure the walls 20 and 22 to the load bed or flooring 16 and for securing the rear wall or end gate 22 to the side walls 20 and the forward ends of the side walls 20 to the front wall 18.

The cover assembly is referred to in general by the reference numeral 24 and includes a pair of Z-shaped angle iron tracks 26 extending along the vertical midportion of the side walls 20 between the end walls 18 and 22. The tracks 26 include upstanding upper flange portions 28 secured to the vertically extending side wall stiffeners 30 by means of fasteners 32, intermediate horizontal flanges 34 projecting horizontally outwardly from the lower marginal edge portions of the corresponding flanges 28 and outer vertical flanges 36 which project downwardly from the outer marginal edge portions of the flanges 34.

In addition, the cover assembly 24 includes a pair of rear end pulleys 38 journalled from stub axles 40 secured through the upper rear corner portions of the side walls 20. In addition, a forward transverse shaft 42 is provided and journalled through journal blocks 44 supported from the front wall 18 by means of support brackets 46. The right hand end of the shaft 42 has a crank 48 mounted thereon and each end portion of the shaft 42 has a pulley 50 mounted thereon for rotation therewith. Accordingly, the pulleys 50 are connected together by the shaft 42 for simultaneous rotation with the shaft 42. Also, each side wall 20 has a tensioning lever 52 pivotally supported therefrom as at 54 and anchored to the forwardmost stiffener 30 by means of an expansion spring 56 having one end secured to the corresponding end of the lever 52 and the other end anchored to the stiffener 30 by means of an anchor bolt 58. An intermediate portion of each lever 52 has an idle pulley 60 journaled therefrom aligned with the corresponding pulley 50.

An elongated flexible tension member 62 is trained about each pulley 38 and once about the corresponding pulleys 50 and 60, the levers 52 serving to maintain the members 62 under tension.

As may best be seen from FIG. 5 of the drawings, although each tension member 62 includes a pair of opposite ends provided with hooks 64, the hooks 64 of each tension member 62 are engaged with apertured anchor tabs 66 carried by opposite side portions of a rectangular anchor sleeve 68. Therefore, each tension member 62 is in effect endless.

A flexible cover member 70 is provided and has one end marginal edge portion 72 secured to the outer surface of the upper marginal edge portion of the front wall 18 in any convenient manner (not shown). The other end portion of the cover member 70 includes an open-ended transverse pocket 74 spaced from the terminal end of the cover member 70 and an elongated stiffening slat 76 is threaded through the pocket 74 and has its opposite ends anchored in the anchor sleeves 68. In addition, longitudinally spaced portions of the opposite side marginal edge portions 78 of the cover member 70 are provided with grommets 80 with which corresponding ends of a plurality of expansion springs 82 are engaged. A plurality of roller followers 84 are rollingly engaged with each of the tracks 26 and the ends of the expansion springs 82 remote from corresponding marginal edge portions 78 of the cover member 70 are anchored to the roller followers 84 as at 86 with the expansion springs 82 under tension. Also, the free end portion of the cover member 70 is provided with opposite side pairs of transversely spaced grommets 88 and each pair of grommets 88 has the opposite ends of an elastic tension member 90 secured thereto, opposite side portions of the outer surface portion of the rear end wall 22 being provided with downwardly opening hooks 92 with which the mid-portions of the corresponding tension members 90 are removably engageable, see FIG. 1. Also, opposite side portions of the outer surface of the front wall 18 are provided with downwardly opening hooks 94 similar to the hooks 92.

A pair of upwardly convergent socket brackets 96 are secured to the center portions of the upper marginal edges of the inner surfaces of the end walls 18 and 22 and an elongated longitudinally extending ridge pole 98 including downwardly curving opposite ends 100 has its opposite ends removably seated in the sockets 96.

It will be noted that the cover member 70 is of sufficient width so that the opposite side marginal edge portions 78 thereof extend downwardly over the upper reach 62' of the tension member 62. Also, it will be noted that when the cover member 70 is shifted between the closed and opened positions thereof illustrated in FIGS. 1 and 2, respectively, that there is very little sliding of the cover member 70 along the upper reaches 62' of the tension member 62, the lower reaches 62'' of the tension member 62 passing through horizontal bores 106 formed in the upper ends of the stiffeners 30.

When it is desired to retract the cover member 70 from the extended position thereof illustrated in FIG. 1 of the drawings, the tension members 90 have their mid-portions disengaged from the hooks 92 and the crank 48 is turned in a counterclockwise direction as viewed in FIG. 4 of the drawings so as to move the anchor sleeves 68 forwardly along the upper marginal edge portions of the side walls 20 and thereby retract the cover member 70 from the extended position illustrated in FIG. 1 of the drawings to an accordion pleated retracted position over the upper marginal edge portion of the front wall 18. It will be noted that as the various portions of the cover member 70 are shifted toward the front wall 18, the roller followers 84 roll along the tracks 26. Of course, the ridge pole 98 is disposed above the upper marginal edges of the side walls 20 and therefore the center portion of the cover member 70 is supported in an elevated position when the cover member 70 is in the extended position so as to prevent the pooling of water on the cover member 70.

Figure 2:
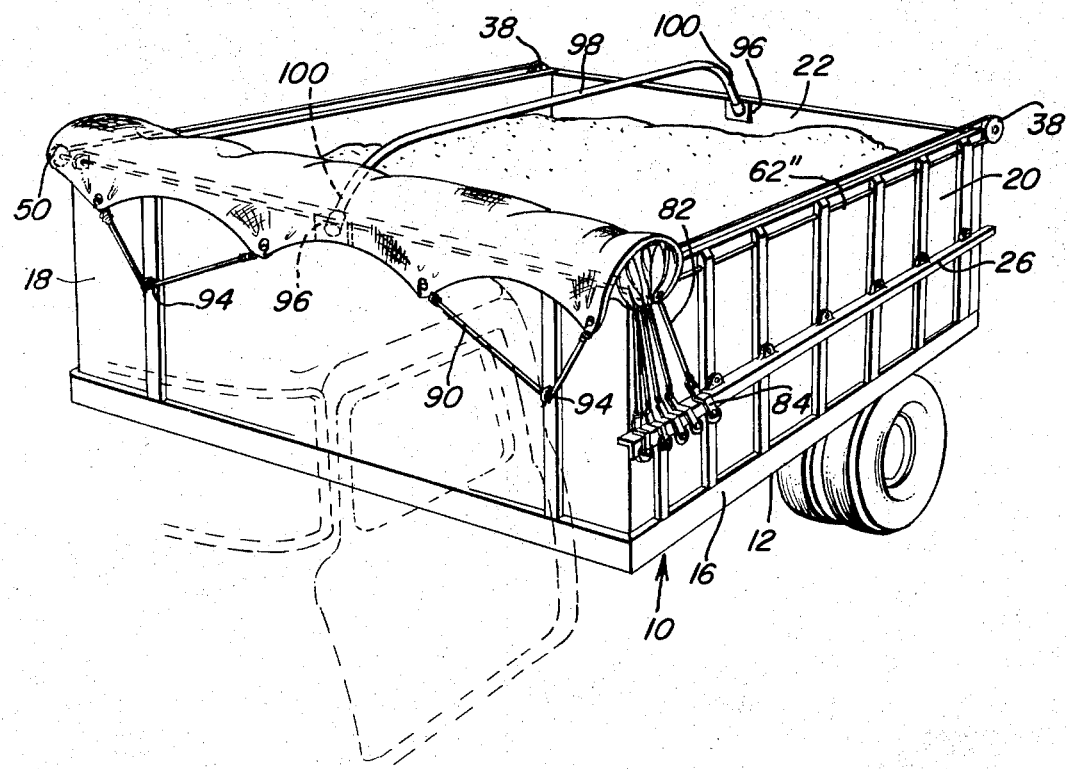
FIG. 2 is a perspective view of the load box as seen from the front end thereof and with the cover assembly in the retracted position.

After the cover member 70 has been shifted toward the retracted position illustrated in FIG. 2 of the drawings, the free end portion of the cover member 70 disposed outwardly of the stiffener 76 may be folded back over the accordion pleated portion of the cover member 70 and the central portions of the tension members 90 may be engaged with the front hooks 94 thus forming a boot over the accordion pleated portion of the cover member 70 to protect the latter against the elements. When in this position, the cover member 70 is supported substantially entirely from the front wall 18 and, if desired, the lower ends of the levers 52 may be swung forwardly against the biasing action of the springs 56 in order to slip the tension member 62 from engagement with the pulleys 60 after which the upper ends of the expansion springs 82 may be disengaged from the grommets 80 and the side walls 20 may be removed. Of course, the ridge pole 98 may be removed to also enable the end gate 22 to be removed.

The longitudinal extent of the free end portion of the cover member 70 disposed outwardly of the stiffener 76 is of sufficient length to be pulled back over the accordion pleated portion of the cover member 70 in the manner illustrated in FIG. 2 of the drawings to form the aforementioned boot.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an upwardly opening load receptacle including longitudinally extending opposite side walls, a cover assembly including front and rear pulleys journaled from the front and rear of said receptacle on each side thereof, an elongated flexible tension member trained over each pair of front and rear pulleys including a reach thereof spaced above and outwardly of the upper marginal edge portion of the corresponding side wall, an elongated flexible cover panel having one end portion anchored to one end of said receptacle and opposite side marginal portions projecting outwardly beyond, draped downwardly over and supported from the corresponding tension member reaches in spaced relation relative to the upper marginal edges of said side walls, a longitudinally extending guide supported from the outer side of each side wall below said opposite side marginal portions of said cover panel, a plurality of followers guidingly engaged with each guide for independent movement therealong, a plurality of elongated tension member sections extending and connected between said followers and longitudinally spaced portions of the corresponding side marginal portions of said cover panel in tensioned condition, and means operatively connected to said tension members for longitudinally shifting said reaches along the upper marginal edge portions of the side walls of said receptacle, said load receptacle including opposite end walls, a center longitudinally extending ridge pole supported from said end walls and including downwardly directed opposite ends, said ridge pole, intermediate the opposite ends thereof, being disposed at an elevation above said upper reaches, the upper portions of the downwardly directed opposite ends of said ridge pole being disposed between said end walls, whereby the reaches of said tension members and said ridge pole cooperate to maintain said cover panel above the upper edges of said side walls.

2. The combination of claim 1 wherein the other end portion of said cover panel is free of connections with said guides and draped downwardly over the upper marginal edge portion of said end wall, the end wall at the other end of said receptacle including horizontally spaced anchor members on the outer side thereof spaced below the upper marginal edge portion of said end wall, said other end portion of said cover panel including spaced anchor means readily removably engaged with said anchor members.

3. The combination of claim 1 wherein said tension members each comprise an endless tension member trained about the corresponding pulleys.

4. The combination of claim 3 wherein the other end portion of said cover panel includes anchor portions at the opposite side marginal portions thereof spaced from the terminal end of said cover panel and anchored to said tension members for movement therewith.

5. In combination with an upwardly opening load receptacle including longitudinally extending opposite side walls, a cover assembly including front and rear pulleys journaled from the front and rear of said receptacle on each side thereof, an elongated flexible tension member trained over each pair of front and rear pulleys including a reach thereof spaced above and outwardly of the upper marginal edge portion of the corresponding side wall, an elongated flexible cover panel having one end portion anchored to one end of said receptacle and opposite side marginal portions projecting outwardly beyond, draped downwardly over and supported from the correspondng tension member reaches in spaced relation relative to the upper marginal edges of said side walls, a longitudinally extending guide supported from the outer side of each side wall below said opposite side marginal portions of said cover panel, a plurality of followers guidingly engaged with each guide for independent movement therealong, a plurality of elongated tension member sections extending and connected between said followers and longitudinally spaced portions of the corresponding side marginal portions of said cover panel in tensioned condition, and means operatively connected to said tension members for longitudinally shifting said reaches along the upper marginal edge portions of the side walls of said receptacle, the other end of said receptacle including a transverse end wall, the other end portion of said cover panel being free of connections with said guides and draped downwardly over the upper marginal edge portion of said end wall, said end wall including horizontally spaced anchor members on the outer side thereof spaced below the upper marginal edge portion of said end wall, said other end portion of said cover panel including spaced anchor means readily removably engaged with said anchor members, said one end of said receptacle also including an end wall having horizontally spaced anchor members, said other end portion of said cover panel, when the latter is retracted toward said one end of said receptacle, being foldable upwardly and back over the remainder of said cover panel for covering the remainder of said cover panel, and said spaced anchor means being readily removably engageable with the last mentioned anchor members.

6. The combination of claim 5 wherein said followers are readily disengageable from said guides, whereby said cover panel may be supported entirely from said last mentioned end wall when said cover panel is in the retracted position.

* * * * *